United States Patent
Mori

(10) Patent No.: US 8,503,002 B2
(45) Date of Patent: Aug. 6, 2013

(54) PRINT CONTROL DEVICE, PRINTING SYSTEM AND COMPUTER-READABLE RECORDING MEDIUM STORING PRINTING PROGRAM

(75) Inventor: Hiromi Mori, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 936 days.

(21) Appl. No.: 12/147,601

(22) Filed: Jun. 27, 2008

(65) Prior Publication Data

US 2009/0002756 A1    Jan. 1, 2009

(30) Foreign Application Priority Data

Jun. 28, 2007  (JP) .................... 2007-170494

(51) Int. Cl.
*G06K 15/00*    (2006.01)

(52) U.S. Cl.
USPC ....... 358/1.14; 358/1.13; 358/1.15; 358/1.16; 358/1.17

(58) Field of Classification Search
USPC ............................ 358/1.15, 1.13, 1.14, 1.16
See application file for complete search history.

(56) References Cited

U.S. PATENT DOCUMENTS

| | | | |
|---|---|---|---|
| 5,835,765 A | | 11/1998 | Matsumoto |
| 5,999,707 A * | | 12/1999 | Taniguchi et al. ........... 358/1.15 |
| 6,337,745 B1 * | | 1/2002 | Aiello et al. ................. 358/1.15 |
| 6,639,687 B1 * | | 10/2003 | Neilsen ......................... 358/1.14 |
| 6,665,740 B1 * | | 12/2003 | Mason et al. ..................... 710/6 |
| 6,897,972 B1 * | | 5/2005 | Noda ........................... 358/1.15 |
| 6,985,243 B1 * | | 1/2006 | Matsueda ..................... 358/1.15 |
| 7,137,115 B2 | | 11/2006 | Sakamoto et al. |
| 7,148,980 B2 * | | 12/2006 | Tominaga ..................... 358/1.15 |
| 7,262,872 B2 * | | 8/2007 | Nakamura .................... 358/1.14 |
| 7,567,359 B2 * | | 7/2009 | Tameshige et al. .......... 358/1.15 |
| 7,804,611 B2 * | | 9/2010 | Castellani .................... 358/1.15 |
| 7,808,661 B2 * | | 10/2010 | Kurotsu ....................... 358/1.14 |
| 2006/0070045 A1 | | 3/2006 | Senda |
| 2006/0274345 A1 * | | 12/2006 | Ferlitsch ....................... 358/1.13 |
| 2008/0030770 A1 * | | 2/2008 | Nishioka et al. ............. 358/1.15 |

FOREIGN PATENT DOCUMENTS

| | | |
|---|---|---|
| JP | 06-332833 | 12/1994 |
| JP | 08-328880 | 12/1996 |
| JP | 08328880 A * | 12/1996 |
| JP | 10-031592 | 2/1998 |
| JP | 11-015611 | 1/1999 |

(Continued)

OTHER PUBLICATIONS

Japanese Patent Office Machine Translation of JP08-328880A.*

(Continued)

*Primary Examiner* — Richard Zhu
(74) *Attorney, Agent, or Firm* — Banner & Witcoff, Ltd.

(57) ABSTRACT

A print controlling device is provided with a print process executing unit capable of concurrently executing a plurality of printing processes for a plurality of printing devices, respectively. Each of the plurality of printing processes is a process for generating print data to be transmitted to a printing device. The print controlling device includes a first judging unit configured to judge whether a number of concurrently executed ones of the plurality of printing processes exceeds a first restriction value, and part of the concurrently executed ones of the plurality of the printing processes is temporarily stopped when the number of concurrently executed ones of the plurality of printing processes exceeds the first restriction value.

6 Claims, 9 Drawing Sheets

FOREIGN PATENT DOCUMENTS

| | | |
|---|---|---|
| JP | 2001-282553 | 10/2001 |
| JP | 2002-278725 | 9/2002 |
| JP | 2003-323273 | 11/2003 |
| JP | 2006-123511 | 5/2006 |
| JP | 2006-133993 | 5/2006 |
| JP | 2006-174247 | 6/2006 |

OTHER PUBLICATIONS

Notification of Reasons of Rejection for Japanese Application 2007-170494; Mailing Date: May 12, 2009.

* cited by examiner

PRINT CONTROL DEVICE, PRINTING SYSTEM AND COMPUTER-READABLE RECORDING MEDIUM STORING PRINTING PROGRAM

CROSS-REFERENCE TO RELATED APPLICATION

This application claims priority under 35 U.S.C. §119 from Japanese Patent Application No. 2007-170494 filed on Jun. 28, 2007. The entire subject matter of the application is incorporated herein by reference.

BACKGROUND

1. Technical Field

The following description relates to a print control device, a printing system employing the print control device and a computer-readable recording medium storing printing program for generating print data to a plurality of printing device in parallel.

2. Related Art

Conventionally, there is known a print control device which generates PDL data to be transmitted to printers connected to the print control device based on data generated by application software running on a personal computer. Such a conversion process is typically executed by a program known as a printer driver. The conventional printer driver is configured such that, when a designated printer is not busy, the printer driver transmits a printing job to the designated printer even if one or more print job are parallelly executed by other printers at the same time.

Specifically, the printer drivers are independent from each other in appearance and operate corresponding to respective printers even if the printer drivers use the same program module. Therefore, a plurality of print jobs may be executed by a plurality of printers connected to the same personal computer. In such a case, run out of memory capacity may occur. To avoid such a problem, a so-called swapping is performed and part of a memory area is temporarily transferred to a hard disk of the personal computer to generate a necessary memory area. An example of such a technique is disclosed in Japanese Patent Provisional Publication No. HEI 11-15611 (hereinafter, referred to as '611 publication).

SUMMARY OF THE INVENTION

If the swapping is performed, however, due to transfer of data between the memory and hard disk, the performance of the CPU of the personal computer is lowered and a printing speed is decreased. According to '611 publication, when the sapping is executed, a user is asked to executed a printing operation. However, the memory area to be used for one printer is checked. Therefore, if a plurality of print jobs are executed at the same time, it may be difficult to avoid the decrease of the printing speed.

Considering the above problem, the present invention is advantageous in that the decrease of printing speed due to the memory swapping is well suppressed.

According to aspects of the present invention, there is provided a print controlling device, which is provided with a print process executing unit capable of concurrently executing a plurality of printing processes for a plurality of printing devices, respectively, each of the plurality of printing processes being a process for generating print data to be transmitted to a printing device, a first judging unit configured to judge whether a number of concurrently executed ones of the plurality of printing processes exceeds a first restriction value, and an operation controlling unit configured to temporarily stop executing part of the concurrently executed ones of the plurality of the printing processes when the number of concurrently executed ones of the plurality of printing processes exceeds the first restriction value.

According to further aspects of the invention, there is provided a print controlling system including a print controlling device and a plurality of printing devices which are connectable with the print controlling device via a network. The print controlling device is provided with a print process executing unit capable of concurrently executing a plurality of printing processes for the plurality of printing devices, respectively, each of the plurality of printing processes being a process for generating print data to be transmitted to a printing device, a first judging unit configured to judge whether a number of concurrently executed ones of the plurality of printing processes exceeds a first restriction value, and an operation controlling unit configured to temporarily stop executing part of the concurrently executed ones of the plurality of the printing processes when the number of concurrently executed ones of the plurality of printing processes exceeds the first restriction value.

According to further aspects of the invention, there is provided a computer-readable recording medium storing computer-readable instructions that cause a computer to execute the steps of concurrently executing a plurality of printing processes for a plurality of printing devices, respectively, each of the plurality of printing processes being a process for generating print data to be transmitted to a printing device, a first judging whether a number of concurrently executed ones of the plurality of printing processes exceeds a first restriction value, and controlling part of the concurrently executed ones of the plurality of the printing processes to be temporarily paused when the number of concurrently executed ones of the plurality of printing processes exceeds the first restriction value.

According to the above configurations, appropriate processing can be provided corresponding to each printing device without installing the programs for processing image data for each and every printer.

BRIEF DESCRIPTION OF THE ACCOMPANYING DRAWINGS

Figure 1:
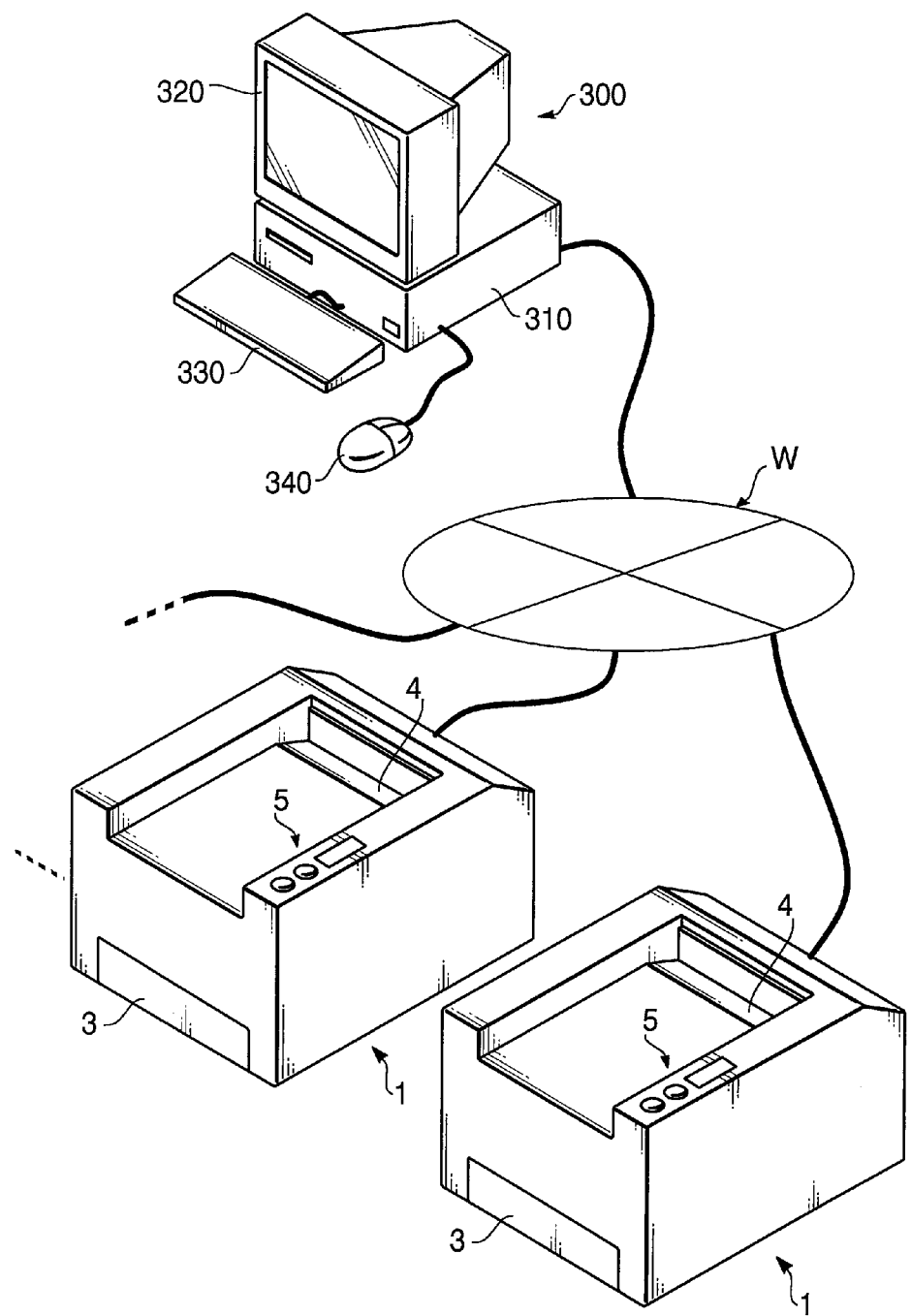
FIG. 1 is a perspective view schematically showing an appearance of a printing system to which the present invention is applied.
Figure 3:
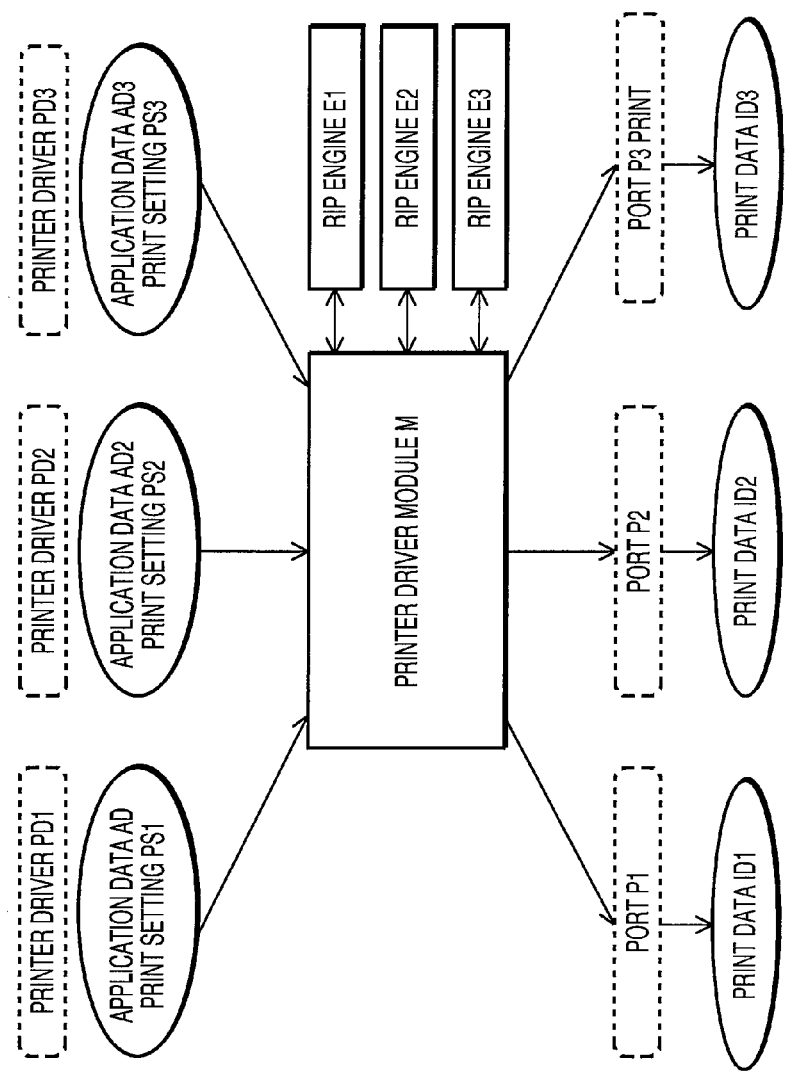

FIG. 3 schematically shows a printing process executed by a personal computer of the printing system shown in FIG. 1.

Figure 4:
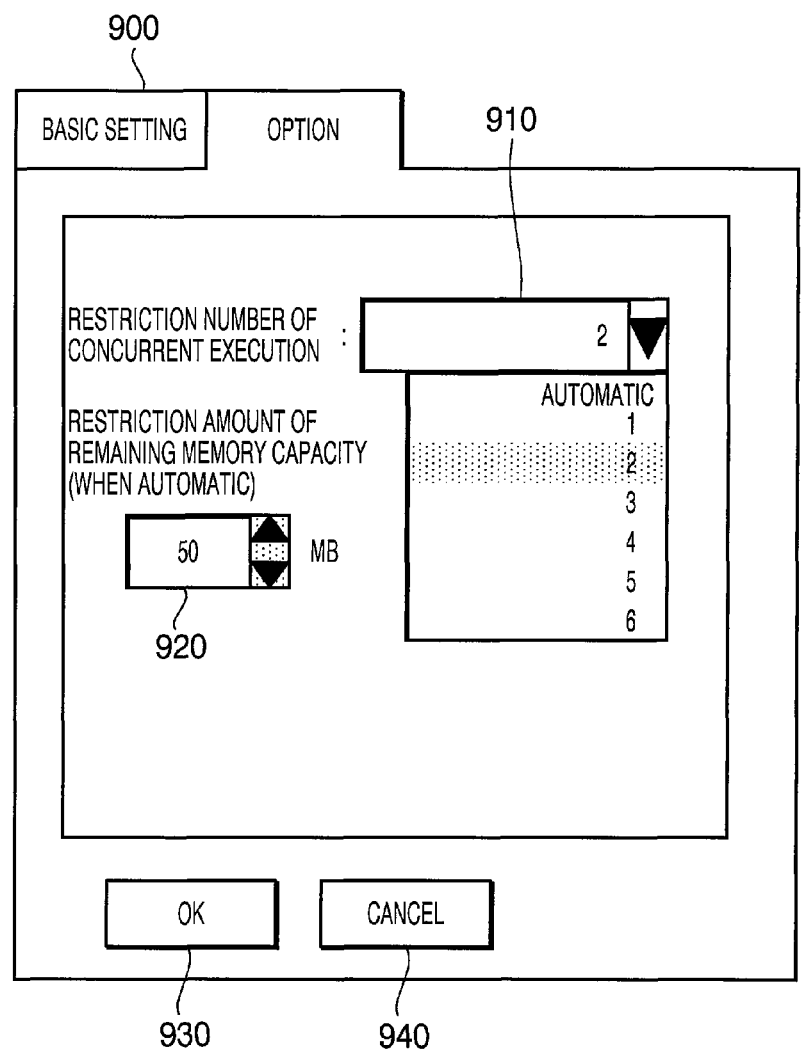

FIG. 4 shows a dialogue window displayed on a display unit of the personal computer.

Figure 5:
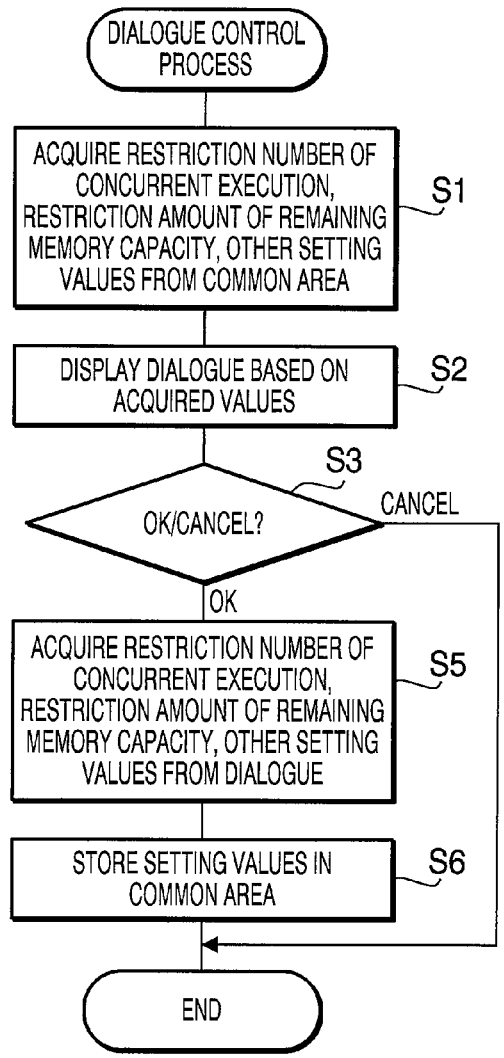

FIG. 5 is a flowchart illustrating a dialogue control process executed in the personal computer.

Figure 6:
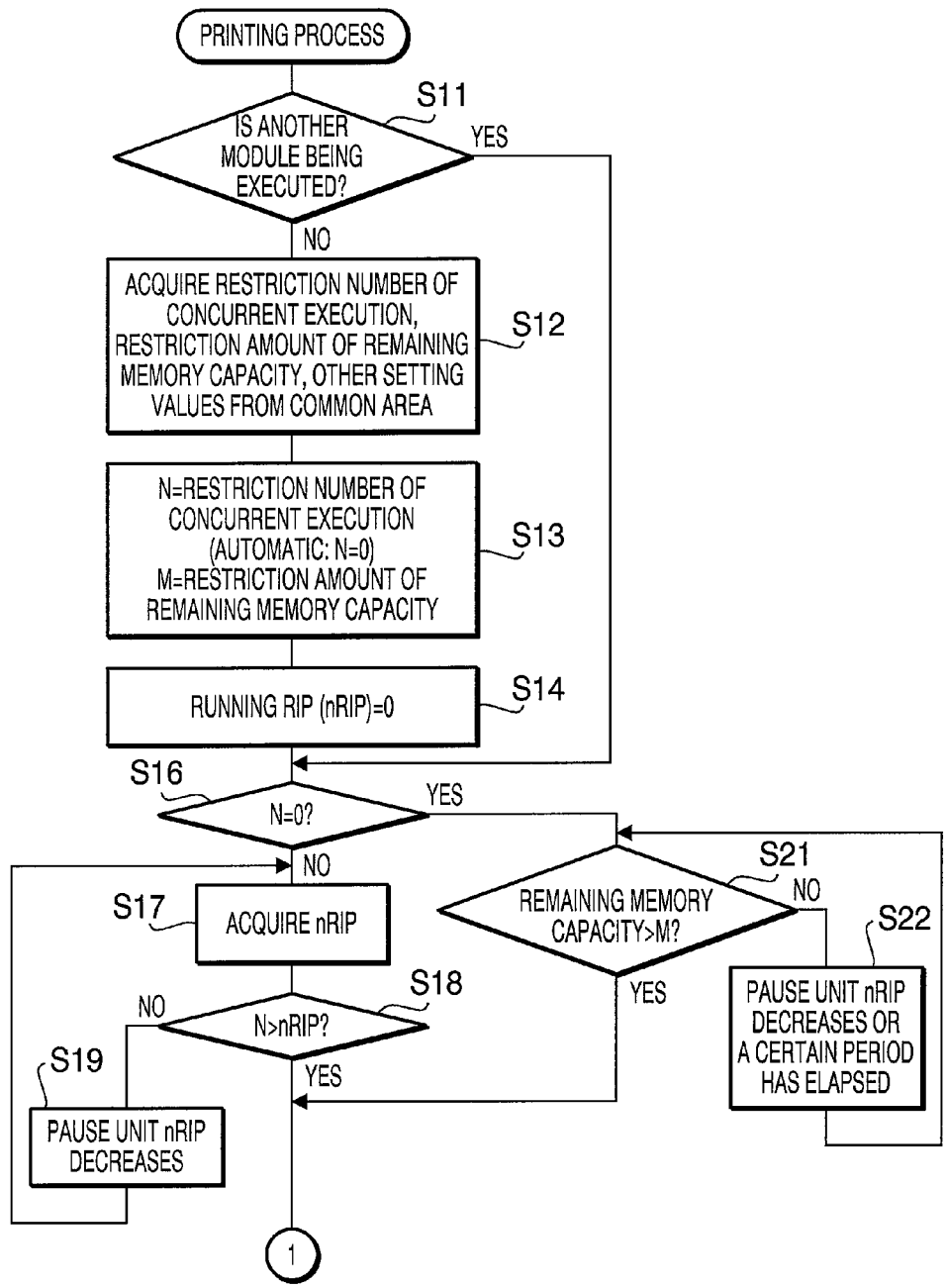
Figure 7:
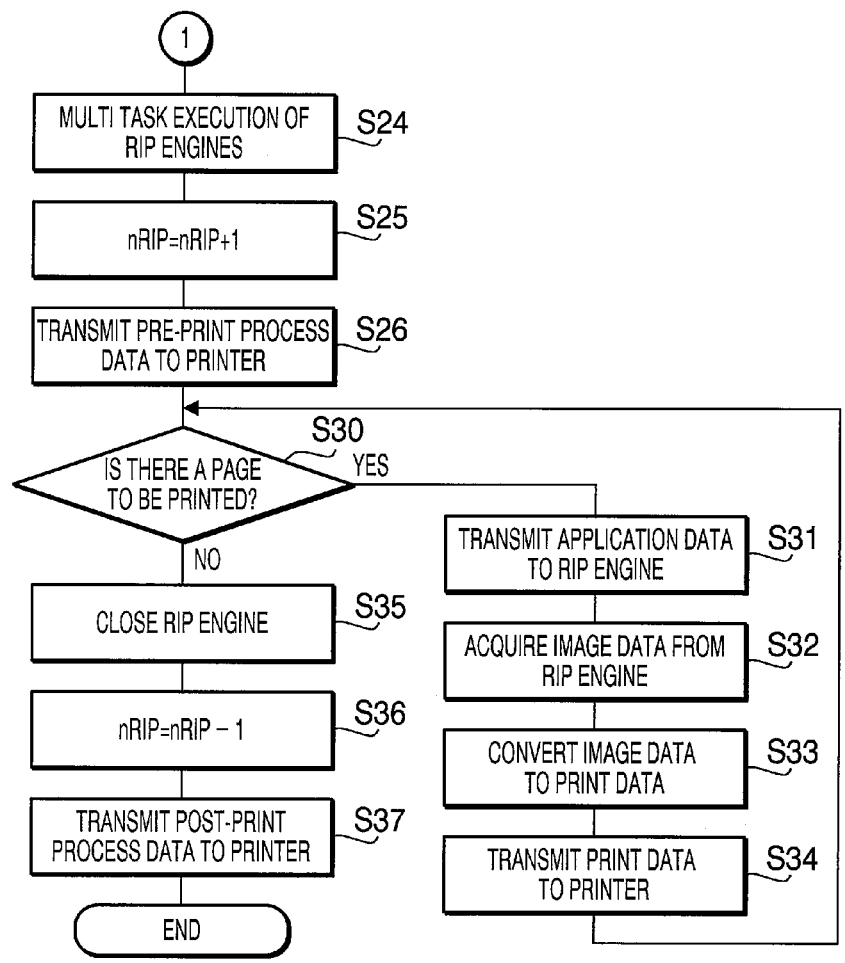

FIGS. 6 and 7 show a flowchart illustrating a printing process executed in the personal computer.

Figure 8:
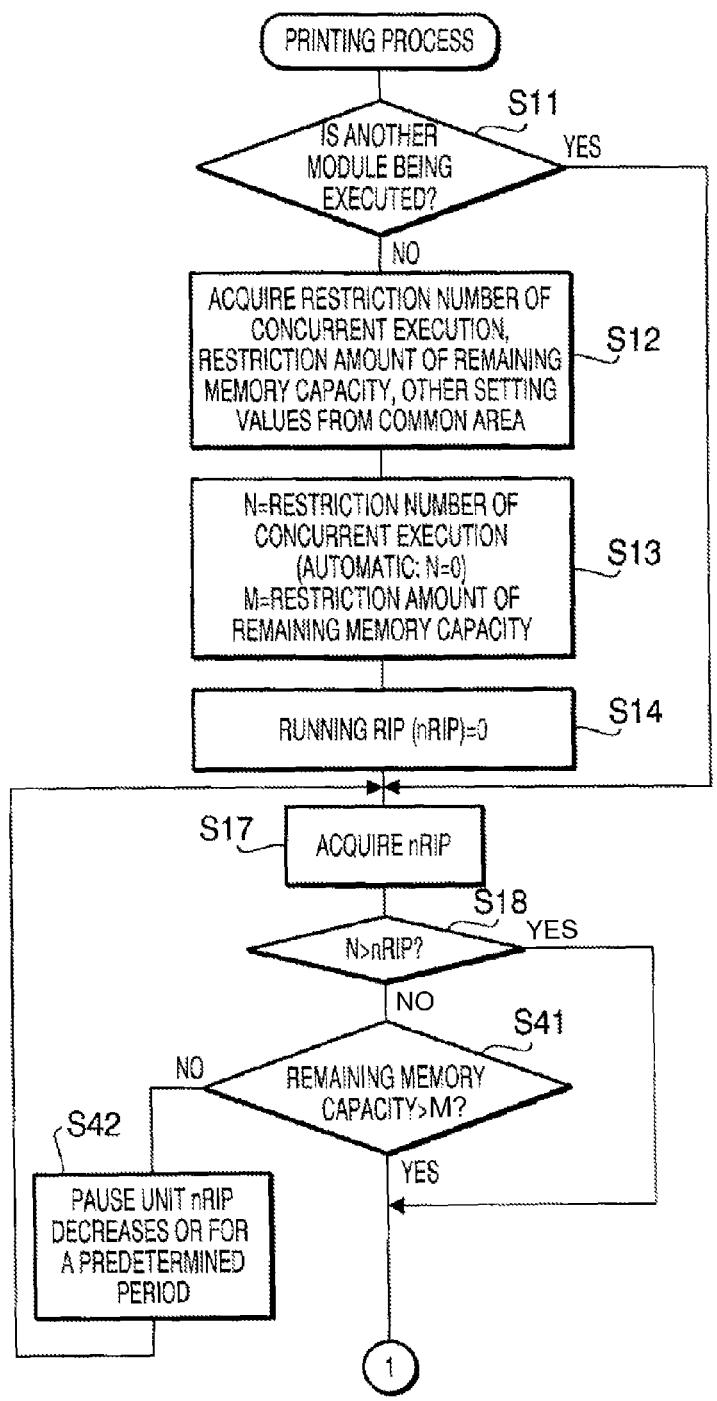
Figure 9:
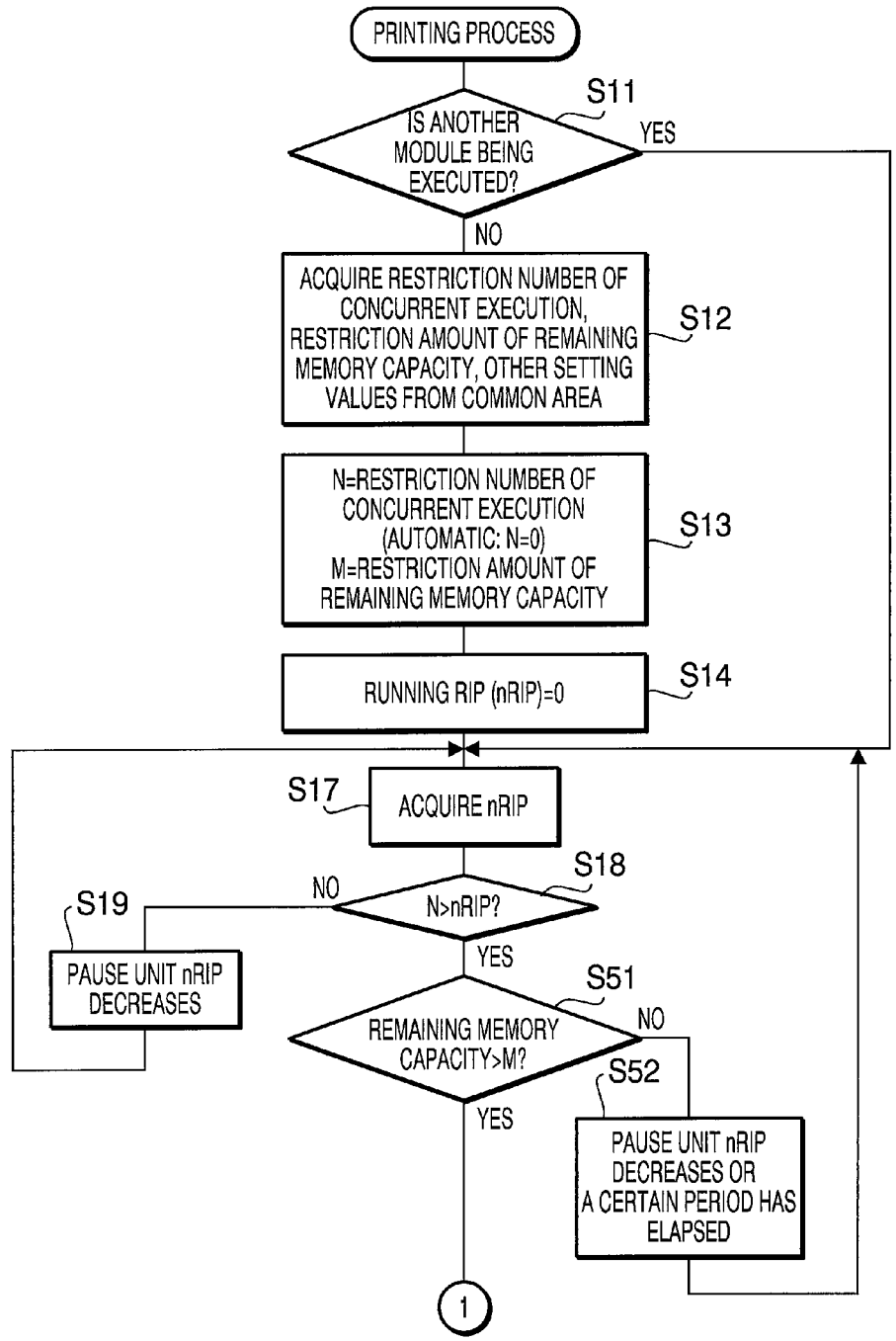

FIG. 8 is a part of a flowchart which replaces FIG. 6 to illustrate a modification of the printing process, FIG. 9 is a part of a flowchart which replaces FIG. 6 to illustrate another modification of the printing process,

DETAILED DESCRIPTION OF THE EMBODIMENT

Referring now to the drawings, a description will be given in detail of preferred embodiment in accordance with the present invention.

FIG. 1 is a perspective view of a printing system according to an embodiment of the invention. The printing system includes, as show in FIG. 1, a plurality of color laser printers (hereinafter, simply referred to as printers) 1, and a personal computer (hereinafter, referred to as a PC) 300, which is connected with the printer 1 via a network W such as a LAN (Local Area Network) or the Internet. It should be noted that, for the purpose of describing the embodiment, the plurality of the printers 1 may be regarded to have the same configuration. Therefore, in the following description, only one printer 1 is described.

The printer 1 is provided with a well-known printer engine 2 (see FIG. 2) which is configured to form images in accordance with a so-called electro-photographic imaging process, using yellow, magenta, cyan and black toners. The printer engine 2 forms images on recording sheets on page basis. Specifically, the recording sheets are accommodated in a sheet feed tray 3 and fed inside the printer 1 one by one. The printer engine 2 forms an image on each of the recording sheets, which are discharged on a stacker 4. On an outer surface of the printer 1, a operation panel 5 is provided. Since the plurality of printers 1 are of the same type, printer drivers controlling the printers 1 are substantially the same.

Figure 2:
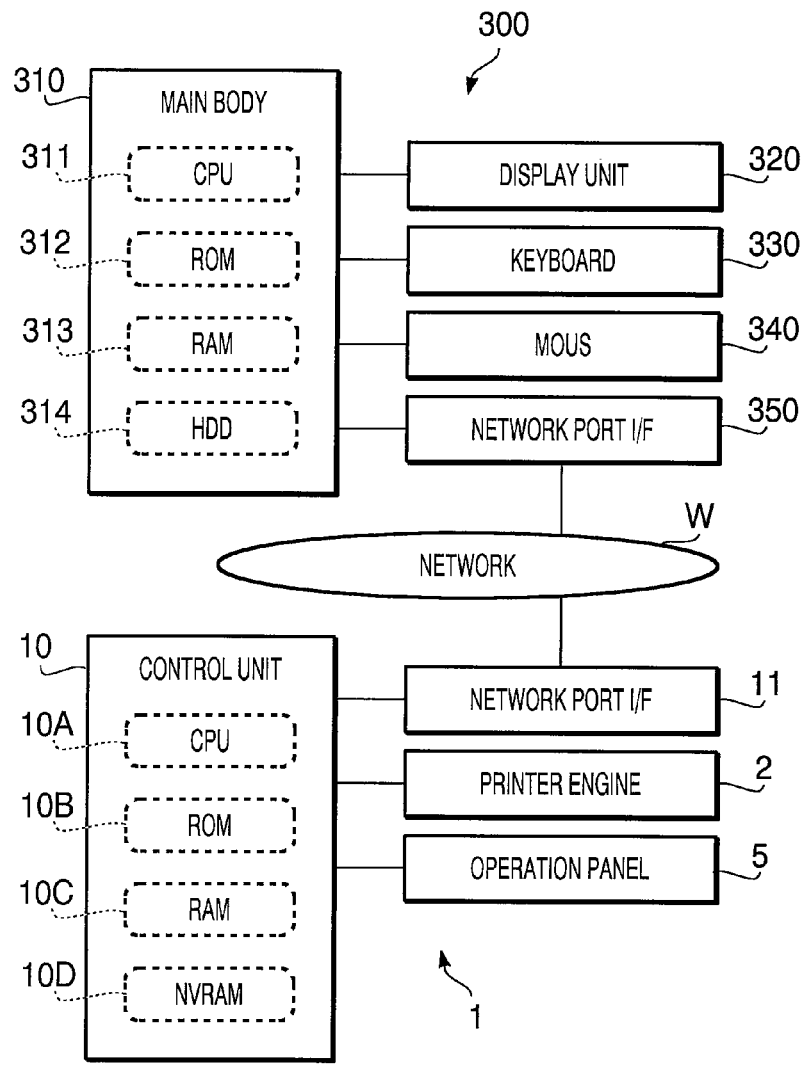
FIG. 2 is a block diagram showing a configuration of a control system of the printing system shown in FIG. 1.

FIG. 2 is a block diagram showing an electrical configuration of the printing system. As described above, the plurality of the printers 1 are of the same type, and thus only one printer 1 is shown in FIG. 2. The other printers 1 have similar configuration as shown in FIG. 2.

As shown in FIG. 2, a main body 310 of the PC 300 includes a CPU (Central Processing Unit) 311, a ROM (Read Only Memory) 312, a RAM (Random Access Memory) 313, and an HDD (Hard Disk Drive) 314. To the main body 310, a display 320 such as a CRT (Cathode Ray Tube), a keyboard 330 and a mouse 340 are connected (see FIG. 1). Further, the main body 310 of the PC 300 is provided with a network port I/F (interface) 350 for connecting the PC 300 to the network W or a public telephone line.

The printer 1 is provided with a control unit 10 for controlling the printer engine 2 and the like. The control unit 10 is configured as a microcomputer provided with a CPU 10A, a ROM 10B and a RAM 10C. The control unit 10 is also provided with an NVRAM (Non-Volatile RAM) 10D which retains data even if power supply is off. The printer 1 further includes a network port I/F (interface) 11 for connecting the printer 1 with the PC 300 via the network W.

Next, a process executed by the control system described above will be described. When a user creates application data with application software on the PC 300 and instructs to execute a printing operation, a printer driver is called (i.e., executed). Then, when the user instructs to start the printing operation, the CPU 311 of the PC 300 executes a printing process as described below based on a program stored on the HDD 314.

FIG. 3 schematically illustrates the printing process executed by the CPU 311. When a plurality of printers 1, to which print instruction can be sent from the PC 300, are connected to the network W, in the PC 300, a plurality of logical ports P1, P2, P3, . . . are set. It should be note that the number of the logical ports is the same as the number of the printers 1. In addition, for the same single printer, a plurality of logical ports can be set in order to use different default print settings.

Then, in the PC 300, a plurality of printer drivers PD1, PD2 and PD3 are provided corresponding to the plurality of ports P1, P2 and P3, respectively. In the embodiment, it is assumed that the printer drivers PD1, PD2 and PD3, which are different in appearance, use the same printer driver module M (e.g., the printer drivers PD2 and PD3 may be copies of the printer driver PD1). It should be noted that the plurality of printers 1 are of the same model, or may be different models but controllable with the printer driver PD1.

In the example shown in FIG. 3, the printer driver PD1 generates print data ID1 based on application data AD1 which is associated with a print setting PS1, and outputs the print data ID1 from the port P1. Similarly, the printer drivers PD2 and PD3 generate print data ID2 and ID3 based on application data AD2 and AD3 which are associated with print settings PS2 and PS3, and output the print data ID2 and ID3 from the ports P2 and P3, respectively. It is noted that, when the printer drivers PD1, PD2 and PD3 convert the application data AD1, AD2 and AD3 to the print data ID1, ID2 and ID3, the printer drivers PD1, PD2 and PD3 use RIP (Raster Image Processor) engines E1, E2 and E3 for rasterizing, respectively.

When one printer driver (i.e., one of the printer drivers PD1-PD3) outputs a plurality of pieces of print data respectively corresponding to a plurality of pieces of application data through a single port (i.e., one of the printer ports P1-P3), the printer driver PD1 (or PD2, PD3) processes the plurality of pieces of application data one by one, and the application data which has not been processed is stored in a waiting queue. However, when the printing process is executed by each of the printer drivers PD1, PD2 and PD3, which are apparently different, a plurality of printing processes are executed in parallel (i.e., concurrently). In such a case, running short of the memory may occur. In particular, the PIP engines E1, E2 and E3 requires relatively large amount of memory and high performance of the PUC 311 since the application data is rasterized (i.e., bitmaps are developed). Therefore, according to the embodiment, a restriction control is performed regarding the print processes which can be executed at the same time.

FIG. 4 shows an option setting page of a setting dialogue 900, which is displayed on the display unit 320, for making various setting commonly used in the printer drivers PD1-PD3. As shown in FIG. 4, the dialogue 900 includes a concurrent executions setting section 910 and a remaining capacity setting section 920. In the concurrent executions setting section 910, a restriction number (first restriction value) of the printing processes which are allowed to be executed concurrently is input. According to the embodiment, concurrent executions of the print drivers PD1-PD3 are restricted if the number of the concurrently executed printer drivers (printing processes) exceeds the value (i.e., the first restriction value) input in the concurrent executions setting section 910. In the remaining capacity setting section 920, a restriction value (second restriction value) of remaining capacity of the memory which is referred to when the setting of the concurrent executions setting section 910 is "AUTOMTTIC" is input. It should be noted that the "remaining capacity" is a capacity of the RAM 313, which is not used and can be used by the printer driver. As shown in FIG. 4, the setting dialogue 900 includes "OK" button 930 and "CANCEL" button 940, which are widely used in this type of setting dialogue for computers. When the "AUTOMATIC" is set, the number of concurrently executed RIP engines is determined depending on the remaining capacity of the RAM 313, and no upper limit is set.

FIG. 5 is a flowchart illustrating a dialogue control process for displaying the dialogue 900 shown in FIG. 3 and storing settings input through the dialogue 900. the dialogue control process is executed by the CPU 311 based on a program stored in the HDD 314.

When the dialogue control process is started, in S1, the CPU 311 retrieves the first restriction value of the concurrent executions and the second restriction value of the remaining memory capacity and other setting values from a common area defined in the HDD 311. Then, in S2, the CPU 311 displays the dialogue 900 in accordance with the setting values retrieved in S1.

When the dialogue 900 is displayed on the display unit 320, the user of the PC 300 may input desired values in the concurrent executions section 910 and/or the remaining memory capacity section 920 and other sections (not shown). In S2, the CPU 311 keep displaying the dialogue 900 with changing the display in accordance with the users operation (e.g., inputting desired values in the concurrent executions section 910 and/or the remaining memory capacity section 920). It should be noted that S2 is kept executed until "OK" button 930 or "CANCEL" button 940 is clicked.

When the user clicks the "CANCEL" button 940 (S3: CANCEL), the CPU 311 finishes the dialogue control process shown in FIG. 5 without storing the values input in S2. When the user clicks the "OK" button 930 (S3: OK), the CPU 311 acquires the values of the concurrent executions and remaining memory capacity and other values as input in the dialogue 900 (S5), and stores the acquired values in the common area of the HDD 314 (S6).

Next, the printing process will be described referring to FIGS. 6 and 7. When the application data is generated using application software in the PC 300, and printout of the application data is instructed, the CPU 311 executes the printing process as shown in FIGS. 6 and 7 based on a program stored in the HDD 314.

As shown in FIG. 6, the CPU 311 judges whether other program modules for the printing process have already been executed (i.e., the printing processes are parallelly executed) in S11. If no other printing process is being executed (S11: NO), the CPU 311 proceeds to S12 and retrieves the first restriction value of the concurrent executions and second restriction value of the remaining memory capacity from the common area of the HDD 314. Then, in S13, the CPU 311 sets the retrieved the first and second restriction values to N and M, respectively. If "AUTOMATIC" is set instead of the first restriction value of the concurrent executions, N is set to zero. In S14, the CPU 311 sets a variable nRIP which represents the number of concurrently executed RIPs to zero, and proceeds to S16. If the CPU 311 judges that other program modules for the printing process have already been executed (S11: YES), the CPU 311 skips S12-S14, and proceeds to S16.

In S16, the CPU 311 judges whether N is set to zero (i.e., whether the "AUTOMATIC" is set as the first restriction value). If N is not equal to zero (S16: NO), the CPU 311 acquires the value of the variable nRIP (S17). As will be described in detail, nRIP represents the number of the printing processes using the RIP engine E (see S25 and S36 described later). In S18, the CPU 311 judges whether value of the variable nRIP is less than N. If the value of the nRIP is equal to or greater than N (S18: NO), the CPU 311 proceeds to S19 and stays thereat in a stand-by state (e.g., sleep state) until the value of the variable nRIP decreases.

It should be noted that, in this stand-by state (S19), the printing process instructs an OS (Operating System) of the PC 300 to notify when termination of the RIP engine is detected, and the process itself stops operating. When the OS of the PC 300 detects termination of one of the concurrently executed RIP engines, the OS of the PC 300 notifies the print process of the termination of one of the RIP engines so that the printing process is restarted.

When the value of the variable nRIP decreases and the printing process is resumed, the CPU 311 returns from S19 to S17 and re-acquires the value of the variable nRIP, which represents the number of concurrently executed RIP engines. Then, if the value of the variable nRIP is less than N (S18: YES), the CPU 311 proceeds to S24. Of course, if the value of the variable nRIP is less than N from the beginning (S18: YES), the CPU 311 proceeds to S24 (without executing S19). It should be noted that, although the printing process is configured to ask the OS to detect and notify of termination of one of the concurrently executed RIP engines, the configuration need not be limited to the above-described one. That is, the printing process may be configured to monitor termination of one of the concurrently executed RIP engine.

If N is equal to zero (S16: YES), the CPU 311 judges whether a remaining capacity of the memory assigned to the printing process is greater than M. If the remaining capacity of the memory is equal to or less than M (S21: NO), the CPU 311 proceeds to S22, where the CPU 311 goes into the stand-by state similarly in S19. If the value of the variable nRIP decreases or a predetermined period has elapsed, the printing process is resumed, and the CPU 311 executes S21 again.

If the remaining capacity of the memory is greater than M (S21: YES), the CPU 311 proceeds to S24. Of course, if the remaining capacity of memory is greater than M from the beginning (S21: YES), the CPU 311 proceeds to S24 similarly, without executing S22. Incidentally, the predetermined period referred to in S22 is should be determined to be an appropriate period for checking the change of the remaining capacity of the memory.

As shown in FIG. 7, in S24, the RIP engine E is executed as a multitask operation, and the value of the variable nRIP is incremented by one in S25. It should be noted that, after the CPU 311 has judged that the value of the variable nRIP is less than N, an interruption process is prohibited from being started. Therefore, from S18 to S25, a case where another printing process is started and the value of the variable nRIP becomes greater than N will not occur. Incidentally, the value of the variable nRIP is also monitored by the OS of the PC 300 and used for controlling the stand-by state (see S19 and S22).

In S26, the CPU 311 transmits pre-processed data to the designated printer 1. The pre-processed data is initial setting data including, for example, PJL (Printer Job Language) commands. In S30, the CPU 311 judges whether there are pages to be printed but not yet printed. If there are pages which have not yet been printed (S30: YES), the CPU 311 proceeds to S31 and transmits the application data AD to the RIP engine E. In S32, the CPU 311 acquires image data, which is obtained by rasterizing the application data AD from the RIP engine E. Then, in S33, the CPU 311 converts the image data to the print data such as the PDL data.

In S34, the CPU 311 transmits the print data converted in S33 to the printer 1, and then the CPU 311 returns the S30. Thus, the steps S30-S34 are repeatedly executed. If there is no pages which have not yet printed (i.e., if all the pages to be printed have been printed) (S30: NO), the CPU 311 proceeds to S35. In S35, the RIP engine E that has been used for the printing process is closed. Then, in S35, the CPU 311 decrements the value of the variable nRIP by one. In S37, the CPU 311 transmits post-processing data to the printer 1, and the printing process is finished. It should be noted that the post-processing data is, for example, a PJL command representing a completion of the printing process.

As described above, according to the embodiment, if the number of the printing processes (S24-S35) parallelly executed is equal to or greater than the restriction value of the concurrent executions (S18: NO), a newly instructed printing process thereafter is controlled to stay in the stand-by state (S19). Further, if the "AUTOMATIC" is set instead of the upper limit of the concurrent executions (S16: YES), when the remaining capacity of the memory is equal to or less than the predetermined restriction value (S21: NO), a newly instructed printing process thereafter is controlled to stay in the stand-by state (S22). With the above configuration, even if a plurality of printing processes are executed in parallel, running out of memory and/or occurrence of swapping can be suppressed and the printing speed will not be lowered.

According to the embodiment, the first and second restriction values can be set in the dialogue 900. Therefore, each user can set desired values in accordance with the demand. For example, it may be possible to set the first restriction value as a relatively large value, accepting that the printing speed may be lowered.

It should be noted that the invention need not be limited to the configuration described above, and can by modified in various ways without departing from the scope of the invention.

For example, in the above-described embodiment, one of the judgments regarding the value of the NRI with respect N (S18) or the remaining memory capacity with respect to M (S22). This may be modified such that the printing process may be controlled depending on a logical sum of the judgments in S18 and S22 or a logical multiplication of the judgments.

FIG. 8 is a par of a flowchart illustrating a modification of the above-described embodiment, and is to replace FIG. 6. According to the modification, if the value of the variable nRIP is equal to or greater than N and if the remaining memory capacity is equal to or less than M, the number of parallelly executed printing processes. Since most of the steps in FIG. 7 are similar to those in FIG. 6, only different steps will be explained.

As shown in FIG. 8, according to the modification, steps S16, S21 and S22, which are included in FIG. 6, are omitted. Further, according to FIG. 8, when the judgment is "NO" in S18, steps S41 and S42 are executed. The other steps are similar to those in FIGS. 6 and 7. Thus, according to the modification, after the initial setting in S12-S14 are executed, or if another printing process has already been executed (S11: YES), the CPU 311 acquires the value of the variable nRIP (S17). If N is greater than the value of the variable nRIP (S18: YES), the CPU 311 proceeds to S24. If the value of the variable nRIP is equal to or greater than N (S18: NO), the CPU 311 judges whether the remaining memory capacity is larger than M (S41). If the remaining memory capacity is larger than M (S41: YES), then steps S24 onwards are executed regardless of the value of the variable nRIP.

According to the modification, if the value of the variable nRIP is equal to or greater than N (S18: NO) and if the remaining memory capacity is equal to or less than M (S41: NO), the CPU 311 goes into the stand-by state (S42) as in S22. Then, when the printing process is resumed thereafter, the process moves to S17. Thus, according to the modification, even if the value of the variable nRIP is equal to or greater than N (S18: NO), if the remaining memory capacity is larger than M (S41: YES), the printing process in steps S24 onwards will be executed. Thus, according to the modification, occurrence of a situation where the printing process goes into the stand-by state can be reduced further.

FIG. 9 shows a part of a flowchart illustrating another (second) modification of the embodiment, and FIG. 9 replaces FIG. 6. According to the second modification, when the value of the variable nRIP is equal to or greater than N, or if the remaining memory capacity is equal to or less than M, the number of printing processes is restricted. Also in FIG. 9, most of the steps are similar to those in FIG. 6, and description will be made on different portions with respect to FIG. 6.

As shown in FIG. 9, according to the second modification, steps S16, S21 and S22 are omitted with respect to FIG. 6, and when the judgment in S18 is "YES," steps S51 and S52 are executed. Thus, according to the modification, after the initial setting in S12-S14 are executed, or if another printing process has already been executed (S11: YES), the CPU 311 acquires the value of the variable nRIP (S17). If the value of the variable nRIP is equal to or greater than N (S18: NO), as in the first embodiment (see FIG. 6), the CPU 311 goes into the stand-by mode and stays until the value of the variable nRIP decreases (S19). On the other hand, if N is greater than the value of the variable nRIP (S18: YES), the CPU 311 judges whether the remaining memory capacity is equal to or less than M. If the remaining memory capacity is equal to or less than M (S51: NO), the CPU 311 goes into the stand-by state (S52) as in S22 in FIG. 6.

According to the printing process as described, only when the value of the variable nRIP is less than N (S18: YES) and further if the remaining memory capacity is larger than M (S51: YES), the print process in steps S24 onwards are executed. Thus, according to the second modification, lowering of the print speed due to swapping and the like can be well suppressed. Incidentally, according to the printing process shown in FIG. 9, setting the number of concurrent executions to "AUTOMATIC" instead of the number of concurrent executions is disabled.

In each of the embodiment and modifications, if the execution of steps S12-S14, the CPU 311 may move to S24 to execute printing operation. According to such a modification, the printing process, when no similar process is concurrently executed, is executed quickly.

What is claimed is:

1. A print controlling device, comprising:
a processor; and
memory storing instructions that, when executed, cause the print controlling device to provide:
a print process executing unit configured to concurrently execute a plurality of printing processes for a plurality of printing devices, respectively, each of the plurality of printing processes being a process for generating print data to be transmitted to a printing device; and
a printer driver module configured to:
concurrently execute a plurality of rasterization engines for the plurality of printing processes,
output results of executing the plurality of rasterization engines to a plurality of ports,
determine whether a number of concurrently executing rasterization engines exceeds a predetermined value and a remaining memory capacity is smaller than a predetermined capacity, and
in response to determining that the number of concurrently executing rasterization engines exceeds the predetermined value and that the remaining memory capacity is smaller than the predetermined capacity, prevent additional rasterization engines from being executed until:
the number of concurrently executing rasterization engines becomes less than the predetermined value: or
the remaining memory capacity exceeds the predetermined capacity.

2. The print controlling device according to claim 1, further comprising:
a storage configured to store the number of concurrently executed rasterization engines, and wherein, when the computer readable instructions are executed, the print controlling device further provides:

an incrementing unit configured to increment the number of concurrently executed rasterization engines stored in the storage by one when a printing process is started; and a decrementing unit configured to decrement the number of concurrently executed rasterization engines stored in the storage by one when the printing process is completed.

3. The print controlling device according to claim 1, wherein the predetermined value is changeable.

4. A non-transitory computer-readable recording medium storing instructions that, when executed, cause a computer to:

concurrently execute a plurality of printing processes for a plurality of printing devices, respectively, each of the plurality of printing processes being a process for generating print data to be transmitted to a printing device;

concurrently execute a plurality of rasterization engines for the plurality of printing processes;

output results of executing the plurality of rasterization engines to a plurality of ports;

determine whether a number of concurrently executing rasterization engines exceeds a predetermined value and a remaining memory capacity is smaller than a predetermined capacity; and in response to determining that the number of concurrently executing rasterization engines exceeds the predetermined value and that the remaining memory capacity is smaller than the predetermined capacity, prevent additional rasterization engines from being executed until;

the number of concurrently executing rasterization engines becomes less than the predetermined value; or the remaining memory capacity exceeds the predetermined capacity.

5. A print controlling system including a print controlling device and a plurality of printing devices which are connectable with the print controlling device via a network, the print controlling device comprising:
 a processor; and
 memory storing instructions that, when executed, cause the print control device to provide:
  a print process executing unit configured to concurrently execute a plurality of printing processes for the plurality of printing devices, respectively, each of the plurality of printing processes being a process for generating print data to be transmitted to a printing device;
  a printer driver module configured to:
   concurrently execute a plurality of rasterization engines for the plurality of printing processes,
   output results of executing the plurality of rasterization engines to a plurality of ports,
   determine whether a number of concurrently executing rasterization engines exceeds a predetermined value and a remaining memory capacity is smaller than a predetermined capacity, and
   in response to determining that the number of concurrently executing rasterization engines exceeds the predetermined value and that the remaining memory capacity is smaller than the predetermined capacity, prevent additional rasterization engines from being executed until:
    the number of concurrently executing rasterization engines becomes less than the predetermined value; or
    the remaining memory capacity exceeds the predetermined capacity 6. The print controlling device of claim 1, wherein the predetermined capacity is changeable.

\* \* \* \* \*